UNITED STATES PATENT OFFICE.

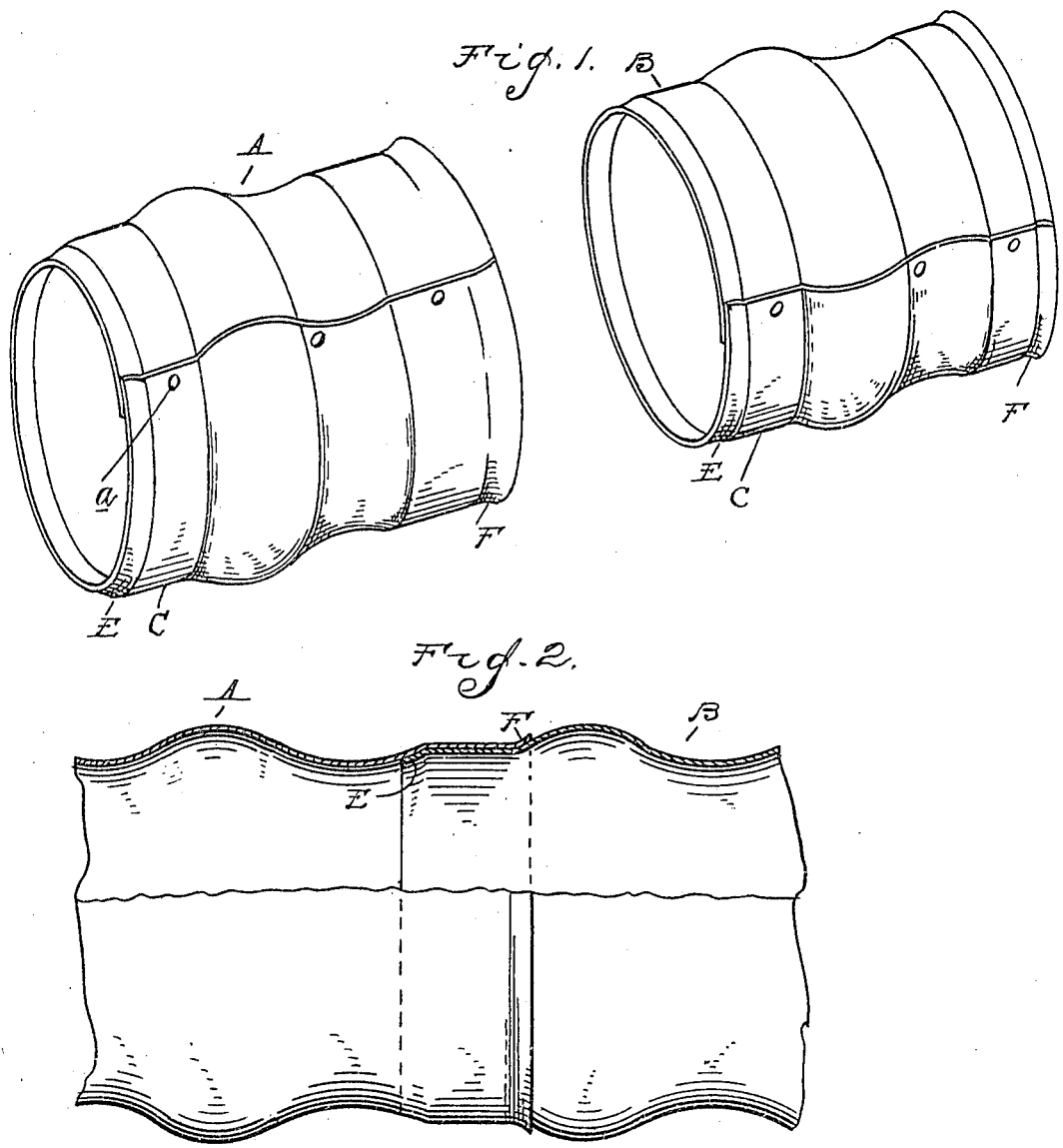

ARCHIBALD McINTYRE, OF CROSWELL, MICHIGAN.

CULVERT.

954,202.  Specification of Letters Patent.  Patented Apr. 5, 1910.

Application filed July 26, 1909. Serial No. 509,604.

*To all whom it may concern:*

Be it known that I, ARCHIBALD MCINTYRE, a citizen of the United States of America, residing at Croswell, in the county of Sanilac and State of Michigan, have invented certain new and useful Improvements in Culverts, of which the following is a specification, reference being had therein to the accompanying drawings.

The invention relates particularly to a sectional metallic culvert formed of corrugated metal, and consists in the construction of the culvert, in the manner of uniting the sections, and in the peculiar arrangement and combination of parts as more fully hereinafter set forth.

In the drawings,—Figure 1 is a perspective view of two adjoining culvert sections detached, showing the formation of the joint; and Fig. 2 is a section, partly in elevation and partly in vertical longitudinal section, showing the sections assembled.

In the drawings thus briefly described, A designates one of the culvert sections, formed from a sheet of corrugated metal, and B a complementary section. Each section is made by bending a sheet of metal into tubular form, uniting the edges preferably by rivets as *a*, and the corrugations are adapted to extend circumferentially as shown, forming a corrugated body proper, and cylindrical smooth ends C preferably of less diameter than that of the body. The cylindrical portions are elongated so as to form an extended bearing surface, and are so fashioned that the cylindrical portion of one culvert section will engage telescopically with the corresponding cylindrical portion of the complementary section, as shown in Fig. 2. I preferably provide a bearing member, as E, in the form of an annular flange upon one of the meeting end portions, which is adapted to engage the body of the complementary section beyond its cylindrical end portion, forming a stop or abutment for preventing further telescoping of the culvert members. I also may and preferably do provide a complementary stop member, as F, in the form of an annular flange adapted to bear upon the body of the opposite member or section and to serve the same purpose and function as the flange E.

A culvert thus constructed may be cheaply manufactured, the sections readily assembled, and by reason of the elongated cylindrical engaging portions the culvert members when in place will be held one to the other without the necessity of securing devices, such as rivets or bolts heretofore employed.

What I claim as my invention is,—

1. In a culvert, the combination of two adjoining culvert sections having circumferentially corrugated body portions and elongated cylindrical telescoping ends, and a member upon one of the section ends engaging the body of the complementary section inwardly beyond its cylindrical portion.

2. In a sectional culvert, the combination of two adjoining culvert sections having circumferentially corrugated body portions and elongated cylindrical meeting ends of less diameter than the bodies, the ends engaging one within the other, and an annular flange upon one of the section ends engaging the body of the complementary section inwardly beyond its cylindrical portion.

3. In a culvert, the combination of two adjoining culvert sections, comprising each a circumferentially corrugated body and elongated cylindrical end portions of less diameter than the body, one of the cylindrical ends of each section having an inturned angular flange and the other engaging end an outwardly flaring flange, the said flanges being adapted to engage the bodies of adjoining sections beyond their cylindrical portions.

4. In a culvert, the combination of two adjoining culvert sections having corrugated body portions and elongated smooth telescoping ends, and a member upon one of said section ends engaging the body of the complementary section inwardly beyond its smooth portion.

In testimony whereof I affix my signature in presence of two witnesses.

ARCHIBALD McINTYRE.

Witnesses:
PHILIP L. GRAHAM,
HENRY MATTHEWS.